(12) United States Patent
Iwata et al.

(10) Patent No.: US 7,787,714 B2
(45) Date of Patent: Aug. 31, 2010

(54) OPTICAL MODULATORS

(75) Inventors: Yuichi Iwata, Nagoya (JP); Osamu Mitomi, Nagoya (JP); Jungo Kondo, Nishikamo-Gun (JP); Kenji Aoki, Ichinomiya (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 0 days.

(21) Appl. No.: 12/336,628

(22) Filed: Dec. 17, 2008

(65) Prior Publication Data

US 2009/0154866 A1    Jun. 18, 2009

(30) Foreign Application Priority Data

Dec. 18, 2007    (JP) .............. 2007-325715

(51) Int. Cl.
*G02F 1/295*    (2006.01)
(52) U.S. Cl. .............................. 385/2; 385/8
(58) Field of Classification Search ....... 385/2
See application file for complete search history.

(56) References Cited

U.S. PATENT DOCUMENTS

| | | | |
|---|---|---|---|
| 5,138,480 A * | 8/1992 | Dolfi et al. .............. | 359/251 |
| 5,502,780 A * | 3/1996 | Rangaraj .............. | 385/3 |
| 5,841,568 A | 11/1998 | Miyakawa | |
| 5,991,491 A | 11/1999 | Madabhushi | |
| 6,700,691 B2 * | 3/2004 | Nespola et al. .............. | 359/254 |
| 2002/0126932 A1 | 9/2002 | Minakata et al. | |
| 2002/0141679 A1 | 10/2002 | Dol et al. | |
| 2004/0264832 A1 | 12/2004 | Kondo et al. | |
| 2008/0193074 A1 | 8/2008 | Sugiyama | |

FOREIGN PATENT DOCUMENTS

JP    2002-169133 A1    6/2002
WO    03/042749 A1    5/2003

OTHER PUBLICATIONS

U.S. Appl. No. 12/336,640, filed Dec. 17, 2008, Iwata et al.

* cited by examiner

*Primary Examiner*—Charlie Peng
*Assistant Examiner*—Eric Wong
(74) *Attorney, Agent, or Firm*—Burr & Brown

(57) ABSTRACT

An object of the present invention is to widen the band of the velocity matching frequency as well as to reduce the electrode loss in the modulation electrode. An optical modulator has a substrate made of an electro-optical material, a signal electrode 3A, 3B and a ground electrode 2A, 2B provided on the substrate, an optical waveguide provided on the substrate. The signal electrode and the ground electrode each has an interaction section 2a, 2c, 3a, 3c and a feed-through section 2b, 2d, 3b, 3d. Light propagating through the optical waveguide is modulated by applying a modulation voltage on the interaction section. The thickness of the feed-through section is greater than that of the interaction section.

4 Claims, 11 Drawing Sheets

OPTICAL MODULATORS

This application claims the benefit of Japanese Patent Application P2007-325715 filed on Dec. 18, 2007, the entirety of which is incorporated by reference.

TECHNICAL FIELD

The present invention relates to an optical modulator.

BACKGROUND ARTS

A demand for broadband communications has increased accompanied with recent developments in multimedia, an optical transmission system exceeding 10 G b/s is in practical use, and a further speeding-up thereof is expected. The LN optical modulator is used as a device for modulating an electric signal (microwave signal) exceeding 10 G b/s into a light signal.

In order to meet the velocity matching condition in the structure designed to thin an optical waveguide substrate, it is necessary to make the thickness of the substrate around the optical waveguide to be about 10 µm, for example. The inventors have applied for a patent of a two-stage back-groove structure with Japanese Patent Laid-Open Publication No. 2002-169133A, in order to prevent the optical mode field pattern from flattening, and to reduce the propagation loss of light generated by the influence of a surface roughness and damages due to thinning the substrate and machining the groove.

The inventors have disclosed, in WO 03/042749A, an optical waveguide device in which a flat supporting substrate and an optical waveguide substrate are adhered

SUMMARY OF THE INVENTION

However, it was generally difficult to design so as to meet all the conditions of the characteristic impedance matching of electrodes, the velocity matching, the drive voltage characteristic, and the electrode loss. For example, in order to reduce the electrode loss in a signal electrode or a ground electrode, it is generally necessary to increase the electrode thickness. However, increasing the electrode thickness will make the velocity matching difficult, and will decrease the frequency of the available band. Accordingly, it was difficult to raise the velocity matching frequency and reduce the electrode loss at the same time. Particularly, in the optical phase modulator adopting the DQPSK, SSB or DPSK system, the total length of the electrode is long, and therefore, the electrode loss of the modulator tends to increase.

An object of the present invention is to widen the band of the velocity matching frequency as well as reduce the electrode loss in the modulation electrode.

An optical modulator of the present invention comprises:
a substrate comprising an electro-optical material;
a signal electrode and a ground electrode provided on the substrate; and
an optical waveguide provided on the substrate, wherein:
the signal electrode and the ground electrode each comprise an interaction section and a feed-through section; and
light propagating through the optical waveguide is modulated by applying a modulation voltage to the interaction section, the thickness of the feed-through section being greater than that of the interaction section.

According to the present invention, it is possible to raise the frequency band for the velocity matching condition in the interaction section by relatively thinning the interaction section of the modulation electrode. At the same time, it is possible to remarkably reduce the whole electrode loss by relatively thickening the feed-through section.

BEST MODES FOR CARRYING OUT THE INVENTION

Figure 1:
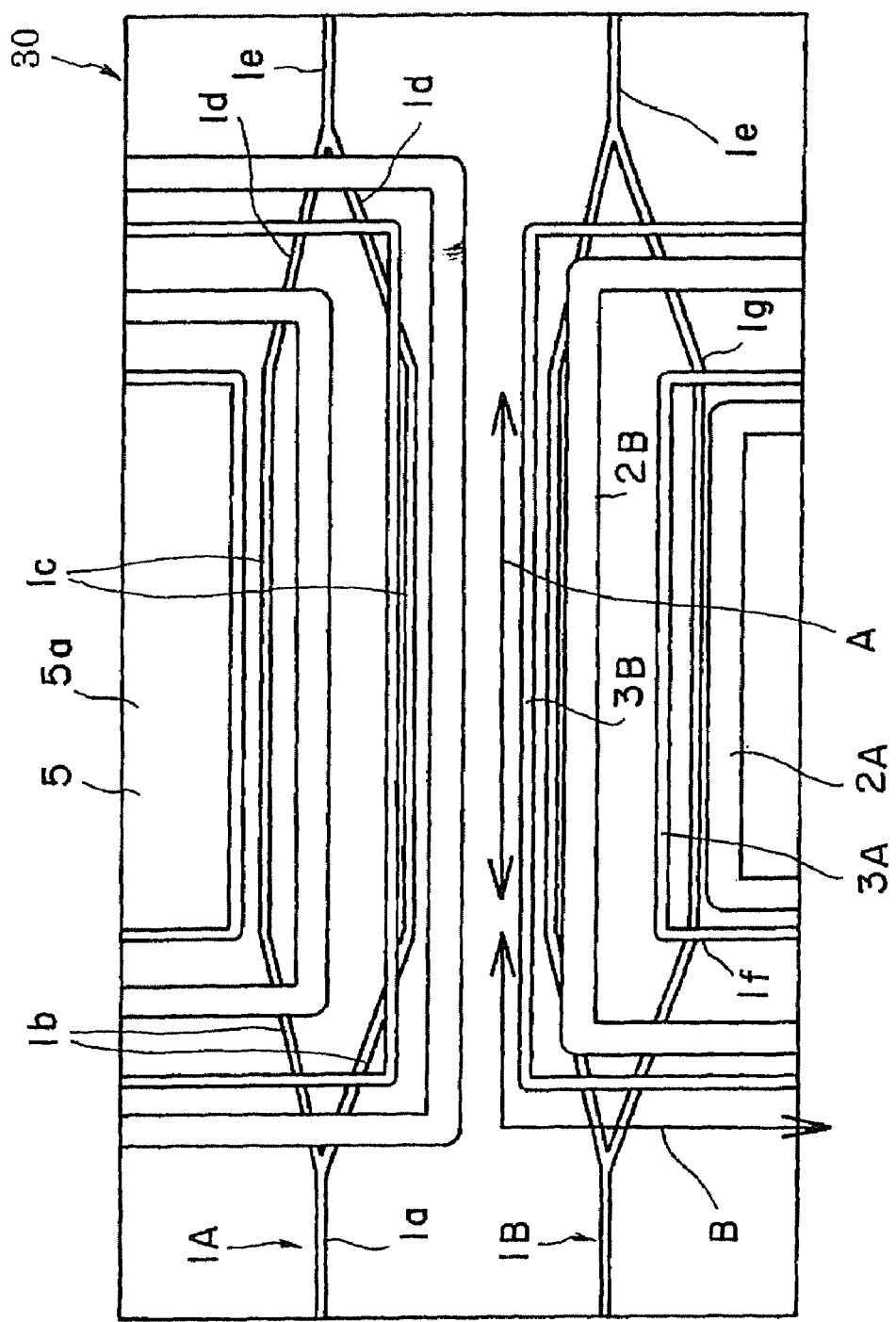
FIG. 1 is a schematic plan view illustrating a planar pattern of an optical modulator 30 according to the present invention.

The optical modulator of the present invention is not limited as long as it applies a modulation to the characteristic of light, and it may be an optical intensity modulator, or an optical phase modulator. The optical intensity modulator may be an optical amplitude modulator using a Mach-Zehnder optical waveguide. The optical phase modulator means one that applies a phase modulation to incident light and picks out a phase modulated signal from outgoing light. The type of the optical phase modulator is not particularly limited, and various modulation systems such as DQPSK, SSB, or the like can be used.

In the preferred embodiment, the optical phase modulator comprises plural optical phase modulation parts. In this embodiment, preferably, a first ground electrode or a second ground electrode of one optical phase modulation part forms a common ground electrode with a first ground electrode or a second ground electrode of an adjacent optical phase modulation part. Forming such a common ground electrode can reduce the dimension required for the optical phase modulation part, and contribute to downsizing the chip.

The phase modulation system in case of using plural phase modulation parts is not particularly limited, and various phase modulation systems can be adopted: such as DQPSK (Differential Quadrature Phase Shift Keying), SSB (Single Side Band amplitude modulation), and DPSK (Differential Phase Shift Keying), etc. These modulation systems themselves are generally known.

The electro-optical material forming the optical waveguide substrate is not particularly limited; however, it is made of a ferroelectric electro-optical material, preferably a single crystal. Such a single crystal is not particularly limited as long as it is capable of modulating light, and the followings can be exemplified: lithium niobate, lithium tantalate, lithium niobate-lithium tantalate solid solution, potassium lithium niobate, KTP, GaAs, and quartz.

The interaction section of the signal electrode and the ground electrode is a section that directly exerts a modulation effect on the light propagating through the optical waveguide. The feed-through section of the signal electrode and the ground electrode is an area that connects the interaction section and an external signal line.

The material of the electrode is not particularly limited as long as it shows a low resistance and an excellent impedance characteristic, and the electrode may be made of such material as gold, silver, copper, and the like.

The optical waveguide is formed on the substrate, preferably formed on the surface side of the substrate. The optical waveguide may be a ridge-type optical waveguide that is directly formed on the surface of the substrate, or a ridge-type optical waveguide that is formed on the surface of the substrate with intervention of another layer, or an optical waveguide formed inside the substrate by means of the internal diffusion method or the ion-exchange method, for example, a titanium-diffusion optical waveguide, or a proton-exchange optical waveguide. Although the electrodes are formed on the surface side of the substrate, they may be formed directly on the substrate surface, or formed on the buffer layer.

The type of an adhesive for adhering the optical waveguide substrate and a supporting substrate is not particularly limited; however, the thickness of the adhesive is preferably below 300 μm. As a low dielectric material preferably used for a low dielectric constant layer, it is desirable to use a material having a low dielectric loss (low tan δ), from the viewpoint of reducing the propagation loss of the high-frequency modulation signal. As such a material having a low dielectric constant or a low dielectric loss, Teflon (registered trademark) and acrylic adhesives can be exemplified. As other low dielectric constant materials, glass-based adhesives, epoxy-based adhesives, interlayer insulators for a semiconductor production, polyimide resin, and the like can be exemplified.

Figure 2:
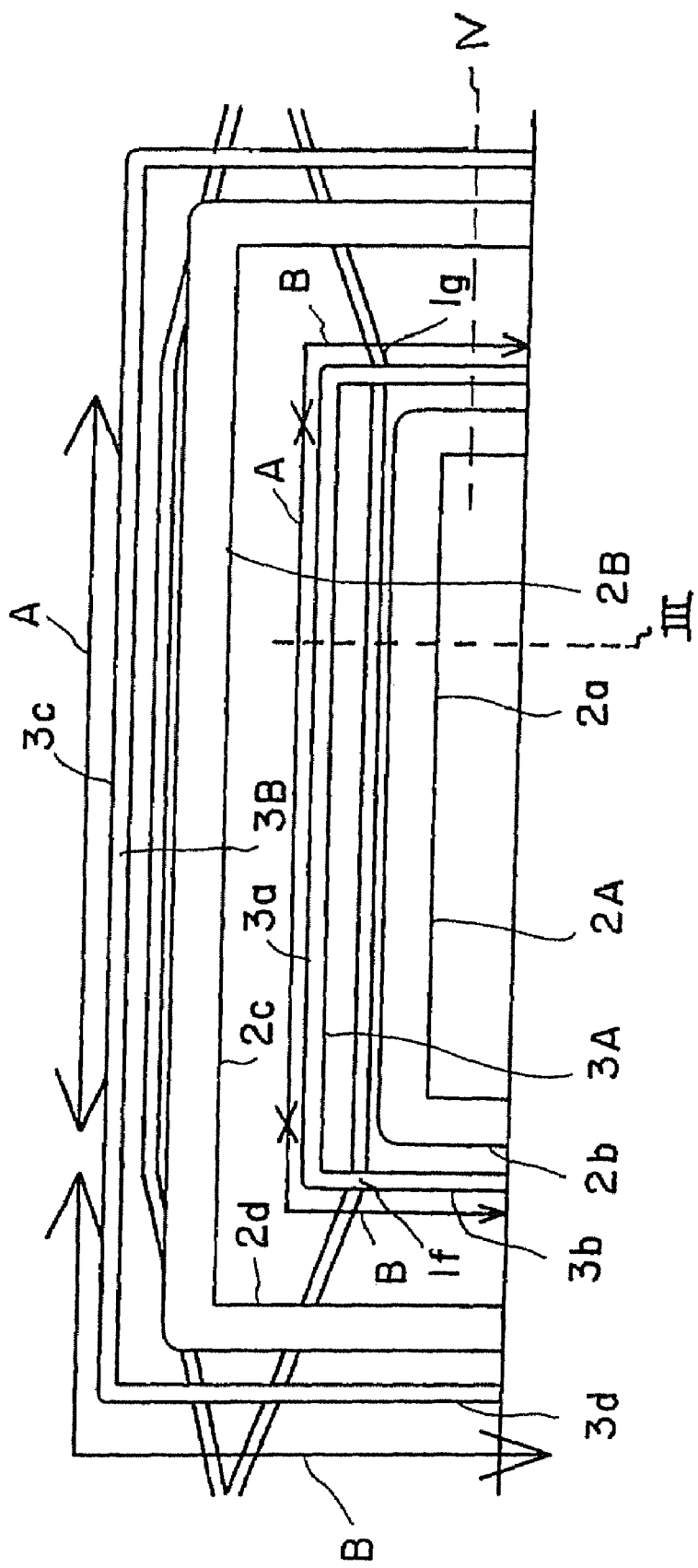
FIG. 2 is a partially enlarged view of the pattern in FIG. 1.
Figure 3:
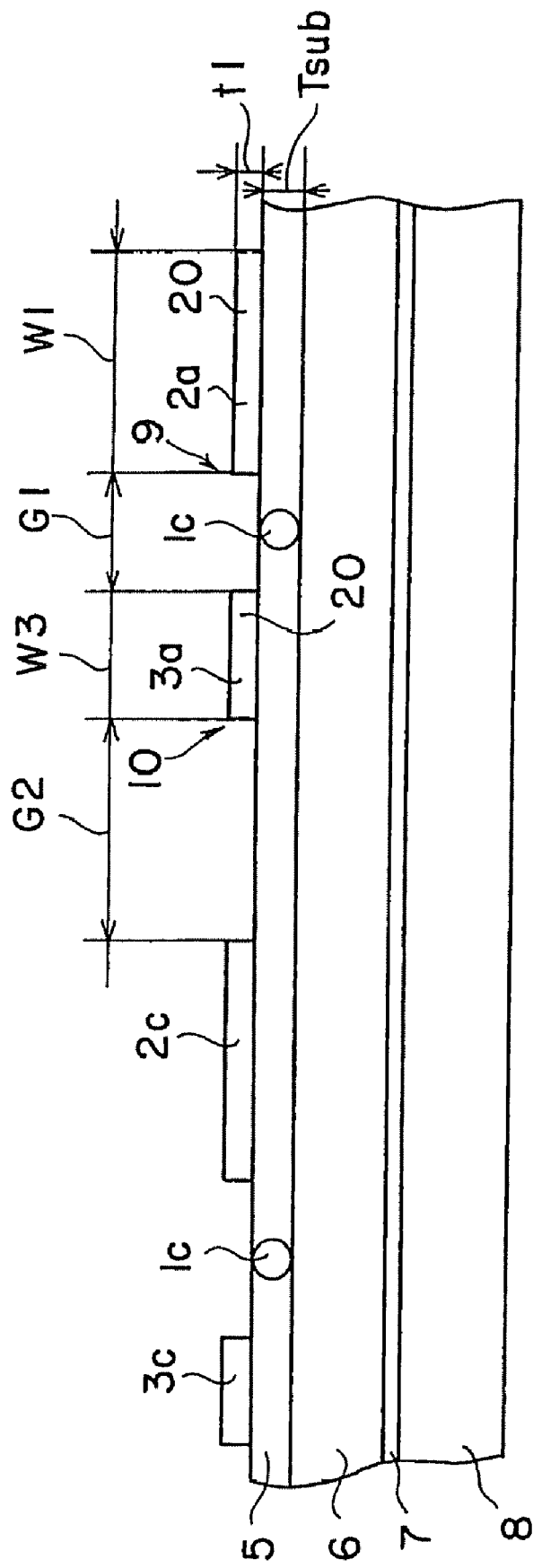
FIG. 3 is a schematic sectional view taken along the line III (refer to FIG. 2) in the interaction section of the optical modulator 30 in FIG. 1.
Figure 4:
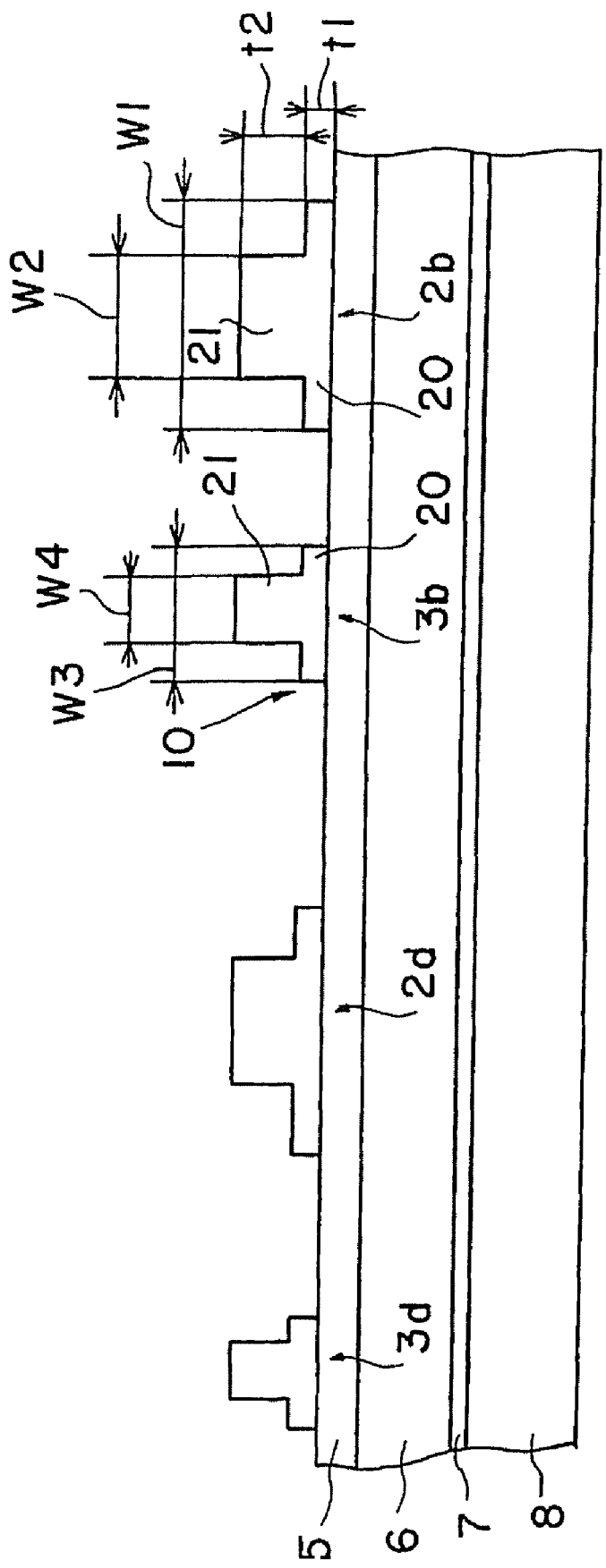
FIG. 4 is a schematic sectional view taken along the line IV (refer to FIG. 2) in the feed-through section of the optical modulator 30 in FIG. 1.

FIG. 1 is a plan view schematically illustrating an optical modulator 30 according to the present invention, and FIG. 2 is a partially enlarged view of the optical modulator in FIG. 1. FIGS. 3 and 4 are sectional views of the optical modulator in FIGS. 1 and 2 taken along the lines III and IV, respectively.

The optical modulator 30 of this example is of the DQPSK system. Two-line Mach-Zehnder optical waveguides 1A, 1B, for example, are formed on a surface 5a of a flat optical waveguide substrate 5. Each of the optical waveguides forms an independent optical modulation part. Each of the optical waveguides has an incident section 1a, branch sections 1b, 1d, interaction sections 1c, and an outgoing section 1e. 1f and 1g are curving points. Thus, four rows of the interaction sections 1c are formed on the substrate 5.

A pair of signal electrodes 3A or 3B and a pair of ground electrodes 2A or 2B are formed corresponding to each of the interaction sections 1c. Gaps 9 are each formed between the signal electrodes and the ground electrodes being adjacent to each other (FIG. 3), and the interaction sections 1c are disposed inside the gaps on the plan view. The symbol A denotes an area of the interaction section, and the symbol B denotes an area of the feed-through section. As specifically shown in FIG. 2, the ground electrode 2A has the interaction section 2a and the feed-through section 2b, and the ground electrode 2B has the interaction section 2c and the feed-through section 2d. The signal electrode 3A has the interaction section 3a and the feed-through section 3b, and the signal electrode 3B has the interaction section 3c and the feed-through section 3d.

Here, according to the present invention, each thickness of the feed-through sections 2b, 2d is greater than that of the interaction sections 2a, 2c; and each thickness of the feed-through sections 3b, 3d is greater than that of the interaction sections 3a, 3c.

Each of the interaction sections 2a, 3a, 2c and 3c is formed of a conductive film 20 having the thickness of t1 in the examples of FIGS. 3 and 4 (FIG. 3). On the other hand, as shown in FIG. 4, each of the feed-through sections 2b, 3b, 2d and 3d has a relatively wide base 20 and a relatively narrow projection part 21 formed on the base 20. The wide base 20 and the narrow projection part 21 are required to be separately patterned with individual masks.

The base 20 has the thickness t1, which is relatively thin, and the patterning resist can be made thin The thin resist can enhance the dimensional accuracy in the patterning, and also remarkably reduce a deviation from the dimensional specification.

On the other hand, providing the projection part 21 in the feed-through section can remarkably reduce the electrode loss. In the case where the feed-through section is provided with a relatively narrow projection part on the base, as in this example, the velocity matching, the characteristic impedance and the like hardly deteriorate.

A conductive film (shielding film) 7 is formed on the surface of a supporting substrate 8. The bottom of the optical waveguide substrate 5 is adhered through an adhesive layer (low dielectric layer) 6 to the conductive film 7 on the supporting substrate 8.

Figure 5:
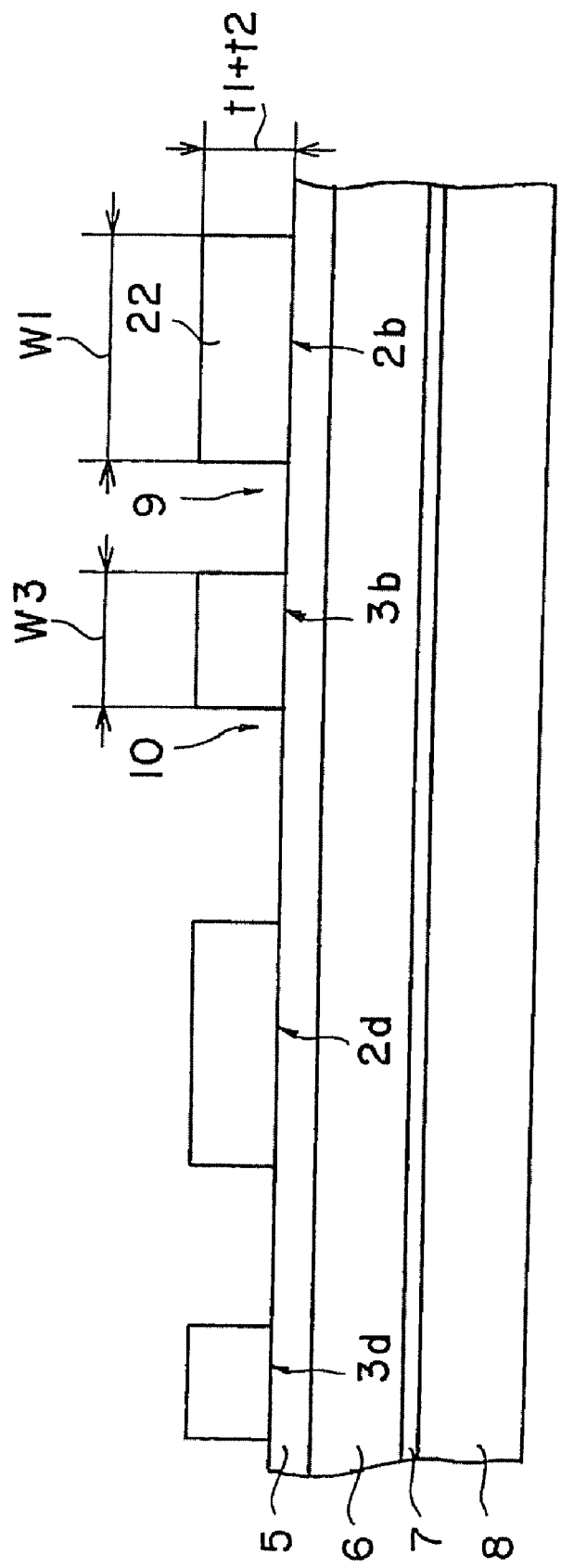
FIG. 5 is a schematic sectional view illustrating the feed-through section of an optical modulator according to another embodiment.

As shown in FIG. 5, the feed-through sections 2b, 3b, 2d and 3d may have a constant width W1 or W3 over the whole thickness. This mode is more advantageous from the viewpoint of reducing the electrode loss in the feed-through section. However, since the patterning accuracy of the feed-trough section deteriorates in this mode, there can be a deviation in the characteristic impedance. From this point of view, it is advantageous that the feed-through section has the base and the projection part.

In the feed-through section, the difference between the width W1 of the base 20 and the width W2 of the corresponding projection part 21, and the difference between the width W3 and the width W4 are preferably not less than 2 μm from the above point of view, further preferably not less than 5 μm. If the difference between the width W1 of the base 20 and the width W2 of the corresponding projection part 21, and the difference between the width W3 and the width W4 become excessively large, the effect of reducing the electrode loss by the present invention will be reduced. Therefore, from this point of view, the above differences are preferably not more than 30 μm, further preferably not more than 20 μm.

The electrode thickness T1 in the interaction section is preferably not more than 15 μm, further preferably not more than 10 μm, from the viewpoint of velocity matching and enhancement of the patterning accuracy. Further, from the viewpoint of securing the conductivity, the electrode thickness T1 in the interaction section is preferably not less than 1 μm.

The electrode thickness (t1+t2) in the feed-through section is preferably not less than 10 μm, further preferably not less than 15 μm, from the viewpoint of reducing the electrode loss. The upper limit of the thickness (t1+t2) is not particularly limited, which is decided by the velocity matching and characteristic impedance required, and in some cases, it is preferably not more than 100 μm, for example.

The width G1 of the gap 9 where the optical waveguide is disposed is not limited; however it is preferably 5 to 100 μm, further preferably 10 to 60 μm.

The thickness Tsub of the optical waveguide substrate 5 is not particularly limited; however it is preferably not more than 20 μm, further preferably not more than 10 μm, from the viewpoint of velocity matching. Further, from the viewpoint of substrate strength, it is preferably not less than 1 μm.

A preferable manufacturing process of the optical modulator according to the present invention will be described hereinafter.

(Manufacturing Method 1)

As shown in FIG. 6(a), a substrate material 11 made of an electro-optical material with a waveguide formed is prepared. As shown in FIG. 6(b), a metal underlying film 12 is formed on a surface 11a of the substrate 11. The type of such a metal underlying film is not particularly limited, but the followings can be exemplified: an Au film, a multilayered film in which the Au film is laminated on a underlying Cr film, and a multilayered film in which the Au film is laminated on a underlying Ti film. The method of forming the films is not particularly limited; however, the spattering method and the evaporation method can be exemplified.

Next, as shown in FIG. 6(c), resists 23 are formed on the metal underlying film 12 by the photolithography method.

Next, as shown in FIG. 7(a), an electrode base 20 is formed between the resists 23. The method of forming this base is not limited, but the plating is preferable. Next, by peeling the resists 23, the state of FIG. 7(b) is obtained. Then, as shown in FIG. 7(c), resists 13 are formed on the base 20 and the metal underlying film 12. Here, an opening is formed through the resist 13 on the left (feed-through section) in FIG. 7(c), and the opening is not provided to the resist 13 on the right (interaction section). By forming a projection 13a on the base 20 on the side of the feed-through section, the opening width of the resist 13 is made narrower than that of the resist 23.

Next, a projection part 21 is formed on the opening of the resist pattern 13 (FIG. 8(a)). The method of forming this part is not limited, but the plating is preferable. Next, the resist pattern 13 is removed and the projection part 21 is formed on the base 20 on the feed-through section (left side), as shown in FIG. 8(b). The projection part is not formed on the right side (interaction section). Next, unnecessary metal underlying film 12 is removed to form the electrodes 2A, 2B, 3A and 3B.

(Manufacturing Method 2)

Figure 9:
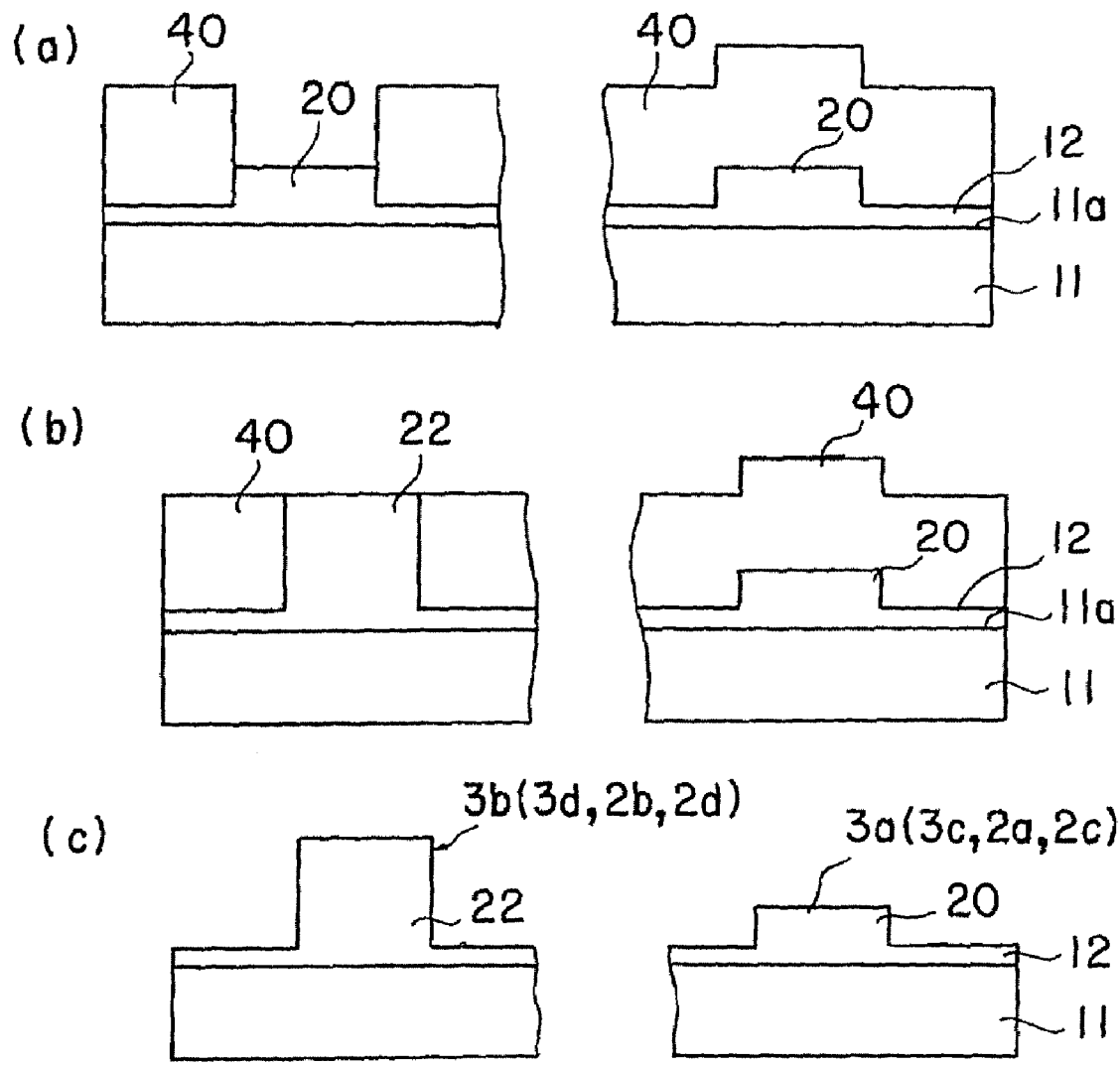
FIG. 9(a) illustrates the state that resists 40 are formed on the substrate material.
FIG. 9(b) illustrates the state that an electrode film 22 is formed inside the resist 40 (feed-through section)
FIG. 9(c) illustrates the state that the resists 40 are peeled off.

The above state of FIG. 7(b) is prepared at the beginning. Next, as shown in FIG. 9(a), resists 40 are formed on the metal underlying film 12 and the base 20. Here, the opening is formed through the resist 40 on the feed-through section (left side), and the resist 40 covers the base 20 on the interaction section (right side).

Next, when the films are formed by the plating, as shown in FIG. 9(b), a metal film is further formed on the base 20 on the feed-through section (left side), and a relatively thick film 22 is formed. On the interaction section (right side), on the other hand, since the base 20 is covered with the resist 40, the metal film is not formed on the base 20. Next, as shown in FIG. 9(c), by peeling the resists 40, the thickness of the feed-through section 3b (or, 3d, 2b, 2d) is made greater than that of the interaction section 3a (or 3c, 2a, 2c).

(Manufacturing Method 3)

Figure 10:
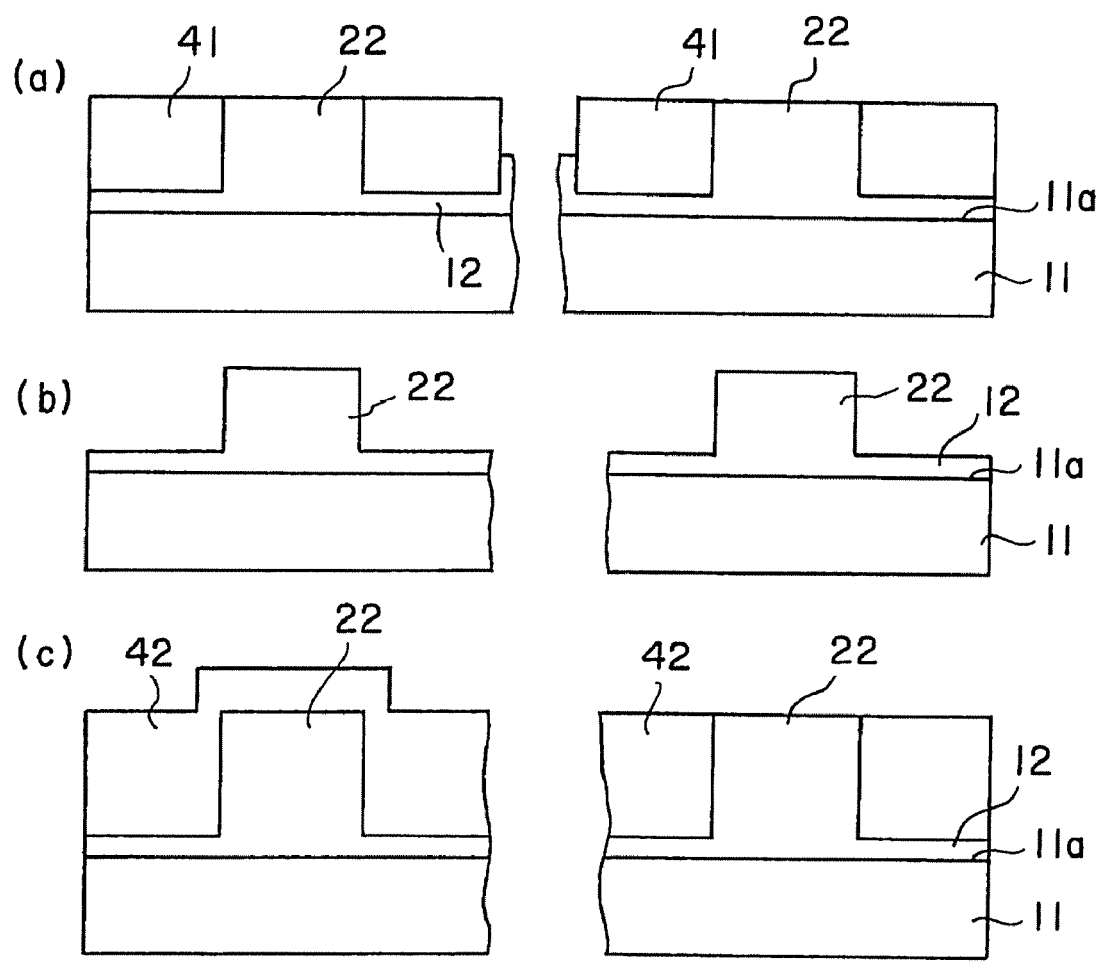
FIG. 10(a) illustrates the state that electrode films 22 are formed on the openings of resists 41.
FIG. 10(b) illustrates the state that the resists 41 are peeled off.
FIG. 10(c) illustrates the state that resists 42 are formed on the substrate material 11.

The above state of FIG. 6(b) is prepared at the beginning. Next, as shown in FIG. 10(a), resists 41 are formed on the metal underlying film 12. Then, metal films 22 are formed by the plating or the like. In this step, the thicknesses of the metal films 22 on the feed-through section (left side) and the interaction section (right side) are substantially the same, (t1+t2) (FIG. 4).

Next, as shown in FIG. 10(b), by peeling the resists 41, the metal films 22 are made exposed. Next, as shown in FIG. 10(c), by forming resists 42, the metal film 22 is covered on the feed-through section (left side), and the metal film 22 is exposed from the opening on the interaction section (right side).

Figure 11:
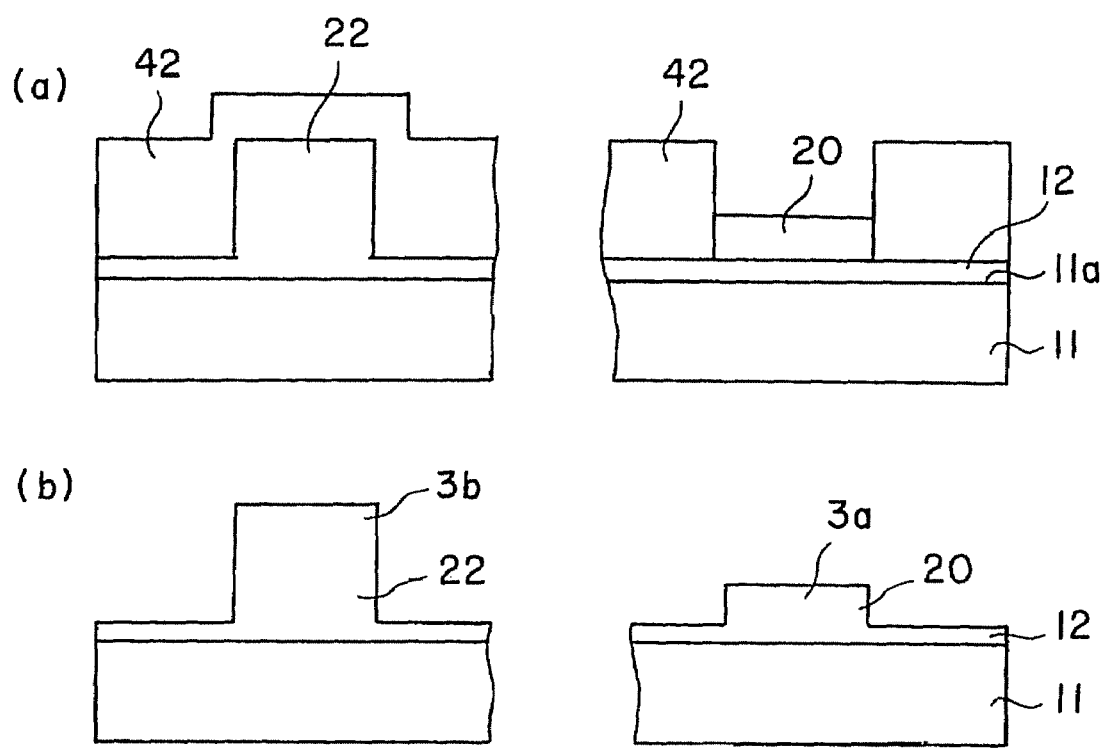
FIG. 11(a) illustrates the state that the electrode film is half-etched (interaction section)
FIG. 11(b) illustrates the state that the resists 42 are peeled off.

A half-etching is applied to the metal films 22 in this state. In this step, since the metal film 22 on the feed-through section (left side) is covered by the resist 42, the metal film 22 is not etched. On the other hand, the metal film 22 is half-etched on the interaction section (right side), and a thinner metal film 20 is formed (FIG. 11). Next, by peeling the resists 42, the feed-through section 22 and the interaction section 20 are made to remain. Then, unnecessary metal underlying film 12 is removed to form the electrodes.

The patterning of the resist can be implemented by the general exposure method. A contact aligner can be used in the exposure.

The material of the resist is not particularly limited, and the followings can be exemplified: novolak resin positive resist, backbone cutting (decomposition) positive resist, cyclized polyisoprene azido compound negative resist, phenol resin azido compound negative resist, dissolution restraint electron beam positive resist, and cross-linked electron beam negative resist.

(Manufacturing Method 4)

As shown in FIG. 6(a), the substrate material 11 made of an electro-optical material with a waveguide formed is prepared. As shown in FIG. 6(b), the metal underlying film 12 is formed on the surface ha of the substrate 11. Next, as shown in FIG. 6(c), the resists 23 are formed on the metal underlying film 12 by the photolithography method.

Next, as shown in FIG. 7(a), the electrode base 20 is formed between the resists 23. The method of forming this base is not limited, but the plating is preferable. After a predetermined plating thickness is obtained, the wafer is taken out temporarily, and the whole surface of the interaction section is covered with a masking tape. The second plating is applied to the feed-through section by the electroplating bath, until a required plating thickness is obtained.

After completing the second plating, the masking tape is removed, and unnecessary resists are removed by means of an organic solvent or a stripping solvent. By this method, the electrode thickness of the feed-through section can be made greater than that of the interaction section, in the same manner as the manufacturing method 1 or 2.

EXAMPLES

Example 1

Figure 6:
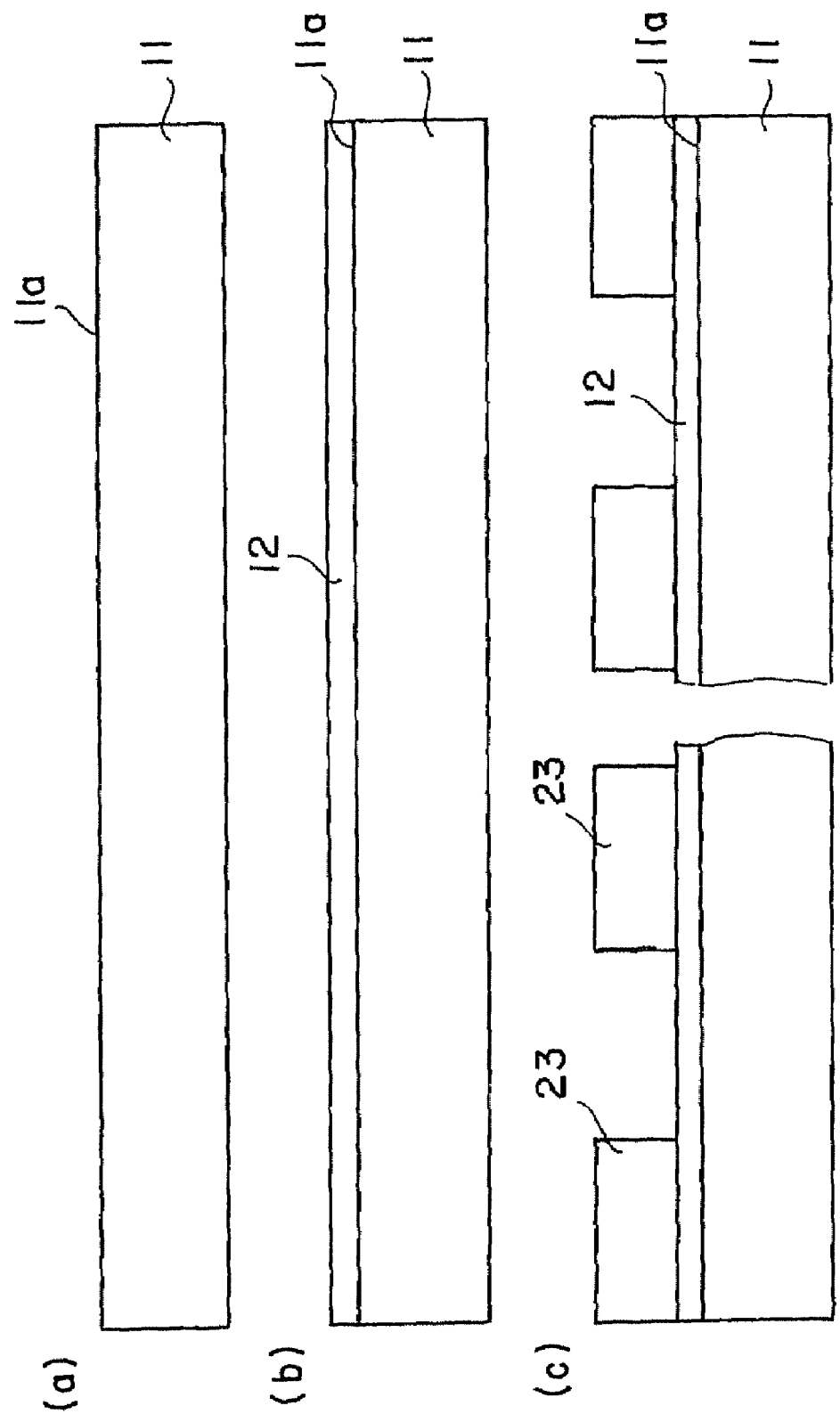
FIG. 6(a) illustrates a substrate material 11.
FIG. 6(b) illustrates the state that a metal underlying film 12 is formed on the substrate material 11.
FIG. 6(c) illustrates the state that resists 23 are formed on the metal underlying film 12.
Figure 7:
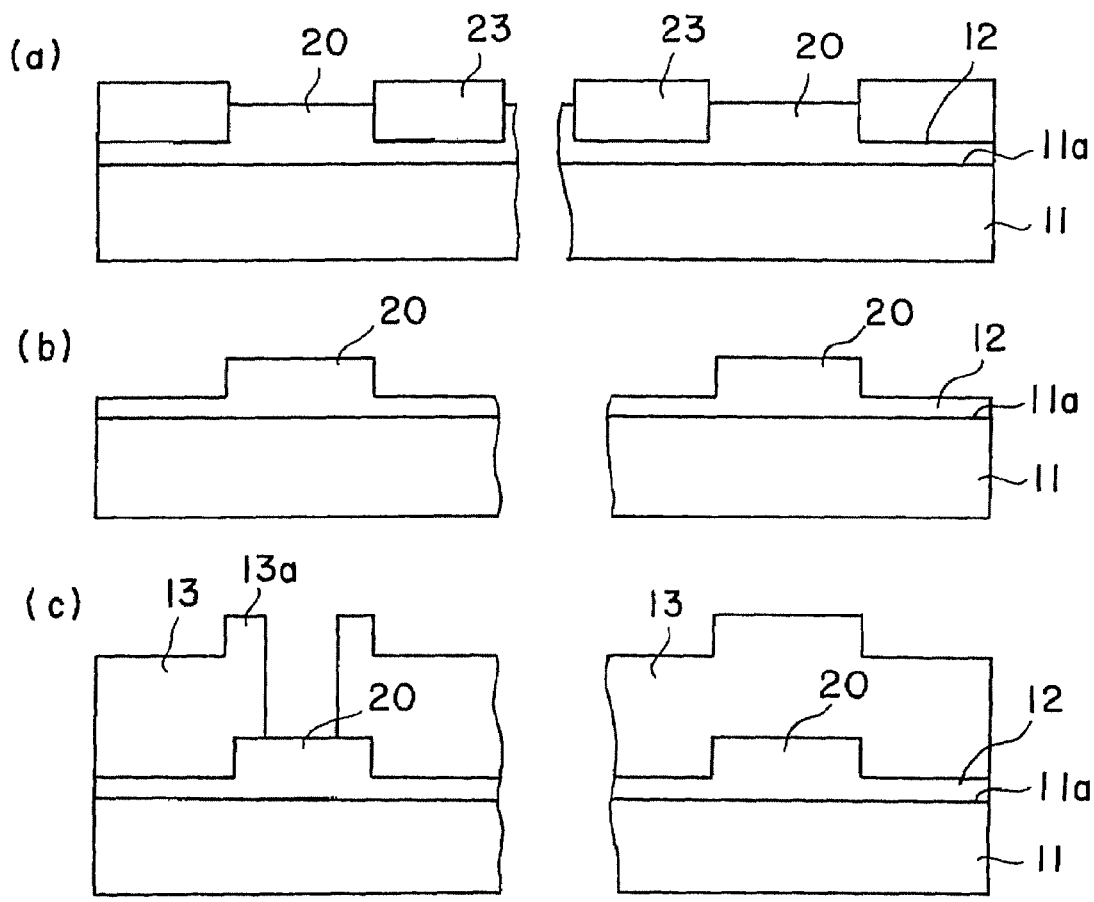
FIG. 7(a) illustrates the state that a base 20 is formed.
FIG. 7(b) illustrates the state that the resists 23 are removed.
FIG. 7(c) illustrates the state that new resists 13 are formed.
Figure 8:
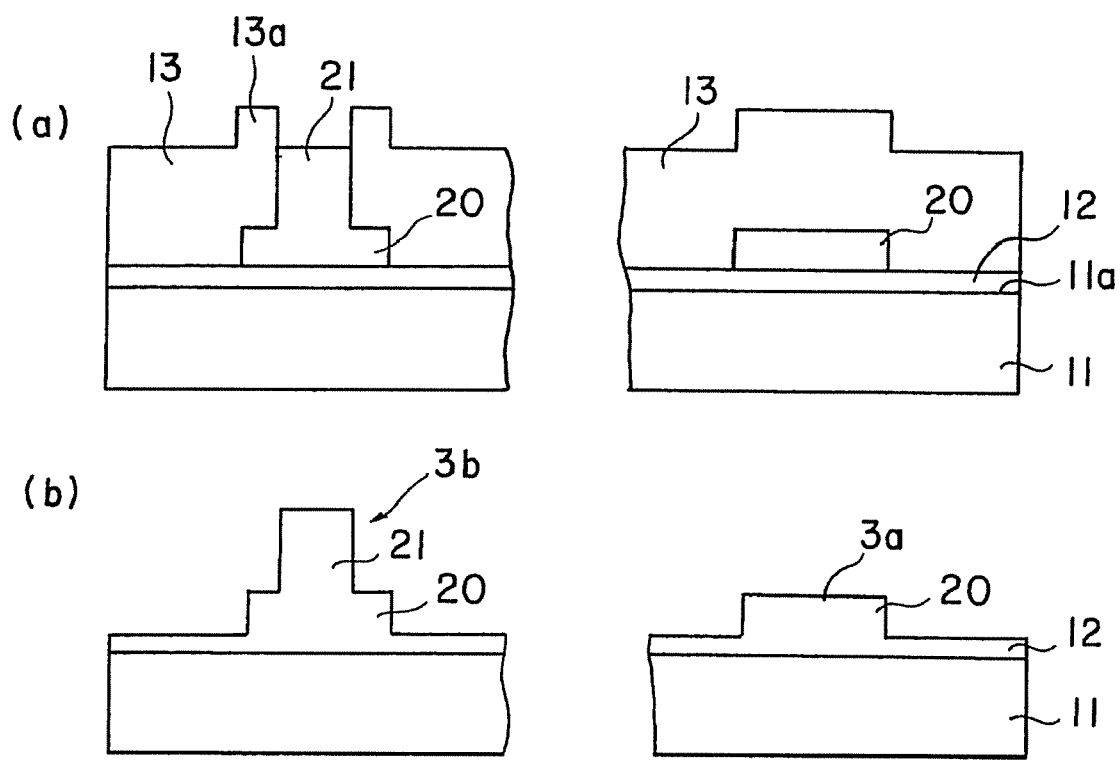
FIG. 8(a) illustrates the state that a projection part 21 is formed inside the resist 13 (feed-through section)
FIG. 8(b) illustrates the state that the resists 13 are removed from the state in FIG. 8(a).

According to the manufacturing methods described with reference to FIG. 6 through FIG. 8, the optical modulator 30 illustrated in FIGS. 1, 2, 3 and 4 was manufactured. As the material for the optical waveguide substrate 5 and the supporting substrate 8, a lithium niobate (LN) single crystal was used. The electrodes 2, 3 were formed with gold. The adhesive layer 6 being also as the low dielectric constant layer was formed with an organic adhesive.

After the Au film 12 was deposited on the LN wafer 11 in which an optical waveguide was formed by the Ti-diffusion method, the desired resists 23 were formed by the general photolithography method, where the electrode base 20 was gold-plated. After peeling the resists 23 temporarily, the resists were again coated, the second resists 13 for the electrodes were formed by photolithography, and the projection part 21 was formed by the gold-plating. The substrate 11 was adhered to the supporting substrate 8 by means of an organic adhesive. This adhered substance was cut out into element forms of desired sizes by a dicing saw, and various element characteristics were measured.

The dimension of the manufactured optical modulator will be described. In FIG. 3, the thickness Tsub of the optical waveguide substrate 5 is 5 µm, the gap width G1 is 15 µm, the gap width G2 is 90 µm, the ground electrode width W1 in the interaction section is 150 µm, and the signal electrode width W3 in the interaction section is 40 µm. The electrode thickness t1 in the interaction section is 6 µm.

In FIG. 4, the ground electrode width W1 in the feed-through section is 150 µm, the width W2 of the projection part is 140 µm, the gap width is 50 µm, the thickness t1 of the base 20 is 6 µm, and the total thickness (t1+t2) of the ground electrode is 26 µm. The base width W3 of the signal electrode in the feed-through section is 60 µm, the width W4 of the projection part 21 is 50 µm, the base thickness t1 of the signal electrode is 6 µm, and the total thickness (t1+t2) of the signal electrode is 26 µm.

On the other hand, an optical modulator in which the feed-through section is not provided with the projection part 21 was manufactured, according to the same construction as above (comparative example). In this case, all the thicknesses of the electrodes in the feed-through section and the interaction section are 6 µm.

In the comparative example, the 3 dB bandwidth was 20 GHz, and the electrode loss at 1 GHz was 1.4 dB. In the example based on the preferred embodiment, on the other hand, the 3 dB bandwidth was 30 GHz, and the electrode loss of the signal electrode was 1.1 dB.

In the description of the above example, the asymmetric coplanar strip line (A-CPS: Asymmetric Coplanar Strip or A-CPW: Asymmetric Coplanar Waveguide) was used as the electrode. In the same manner, it will be possible to achieve the similar effect to the present invention also for a modulation electrode using, for example, a coplanar strip line CPW (Coplanar Waveguide), when the characteristic impedance is designed so as to take an appropriate value, and such a substrate thickness and an electrode dimension that satisfy the velocity matching condition in the interaction section are adopted.

In the above example, an X-cut lithium niobate was used to the optical waveguide substrate 5. When a Z-cut lithium niobate is used to the optical waveguide substrate 5, for example, the following dimensions are generally adopted: the substrate thickness Tsub is 0.1 to 1 mm, the width W3 of the signal electrode in the interaction section is about 5 to 20 µm, and the gap width G1=G2 between the signal electrode and the ground conductor is about 10 to 100 µm. By setting the electrode thickness T1 of the base to about 1 to 100 µm so as to satisfy the velocity matching condition in the interaction section, setting the differences between the widths W1, W3 of the base and the widths W2, W4 of the corresponding projection parts to about 2 to 30 µm, and setting the electrode thickness T2 of the projection part so that the characteristic impedance becomes an appropriate value, the electrode losses can be reduced. Although the upper limit of the thickness Tmup of the projection part is not limited, it may be preferably about 100 µm. The present invention can also be applied to an optical modulator using traveling-wave electrodes or lumped electrodes.

The invention claimed is:

1. An optical modulator comprising:
   a substrate comprising an electro-optical material;
   a signal electrode and a ground electrode provided on the substrate; and
   an optical waveguide provided on or in the substrate, wherein:
   the signal electrode and the ground electrode each comprise an interaction section and a feed-through section; and light propagating through the optical waveguide is modulated by applying a modulation voltage on the interaction section,
   the feed-through section having a thickness greater than that of the interaction section.

2. The optical modulator of claim 1, wherein the feed-through section comprises a base formed on the substrate and a projection part having a width smaller than that of the base.

3. The optical modulator of claim 1, wherein a gap is formed between the interaction section of the signal electrode and the interaction section of the ground electrode, and wherein the optical waveguide is disposed in the gap.

4. The optical modulator of claim 2, wherein the projection part is thicker than the base.

* * * * *